United States Patent [19]

Sirkkala

[11] Patent Number: 5,765,492
[45] Date of Patent: Jun. 16, 1998

[54] SEEDING METHOD AND APPARATUS

[76] Inventor: Juha Sirkkala, Kokkilantie 6, FIN-15540 Villähde, Finland

[21] Appl. No.: 809,378

[22] PCT Filed: Sep. 8, 1995

[86] PCT No.: PCT/FI95/00488

§ 371 Date: Mar. 6, 1997

§ 102(e) Date: Mar. 6, 1997

[87] PCT Pub. No.: WO96/07307

PCT Pub. Date: Mar. 14, 1996

[30] Foreign Application Priority Data

Sep. 8, 1994 [FI] Finland ................... 944122

[51] Int. Cl.⁶ ........................................... A01C 7/20
[52] U.S. Cl. ............................... 111/200; 111/130
[58] Field of Search .................... 111/100, 101, 111/7, 8, 130, 127, 128, 52, 96, 188, 189, 200, 915, 925; 38/903, 266, 235, 236

[56] References Cited

U.S. PATENT DOCUMENTS

| | | | |
|---|---|---|---|
| 3,490,654 | 1/1970 | Fischer | 111/130 X |
| 3,799,081 | 3/1974 | Wilsor | 111/130 |
| 4,296,695 | 10/1981 | Ouanbeck | 111/34 |
| 4,491,275 | 1/1985 | Holsworth | 37/903 X |
| 4,970,973 | 11/1990 | Lyle et al. | 172/26 X |
| 5,156,102 | 10/1992 | Andersen | 111/175 |

FOREIGN PATENT DOCUMENTS

| | | |
|---|---|---|
| 2053831 | 4/1971 | France . |
| 406539 | 2/1979 | Sweden . |
| 422728 | 3/1982 | Sweden . |
| 469255 | 6/1993 | Sweden . |
| 1136771 | 12/1968 | United Kingdom ........ 111/127 |
| 94 19925 | 9/1994 | WIPO . |

Primary Examiner—Terry Lee Melius
Assistant Examiner—Robert Pezzuto
Attorney, Agent, or Firm—Ostrolenk, Faber, Gerb & Soffen, LLP

[57] ABSTRACT

A method and apparatus for sowing seeds using compressed-air pulses is provided. The apparatus includes a seed supply, a compressed-air duct extending to a sowing site, a compressed-air pulse producer for sending compressed-air pulses through the duct, and a seed dispenser communicating with the seed supply and the duct. The seed dispenser includes a reciprocating piston having an adjustable seed amount metering space for receiving a quantity of seeds from the seed supply. The piston is also biased toward the duct and has a depressible portion communicating with the duct. The piston moves toward a loading position when a compressed-air pulse exerts pressure against the depressible portion and returns toward a dispensing position in the absence of a compressed-air pulse exerting pressure against the depressible portion, the metering space communicating with the seed supply when the piston is in the loading position and the metering space communicating with the duct when the piston is in the dispensing position.

18 Claims, 2 Drawing Sheets

SEEDING METHOD AND APPARATUS

The present invention relates to carrying out the sowing of seeds on a desired soil. The invention relates also to a sowing apparatus for carrying out the method.

It is prior known to carry out the sowing in such a manner that the seeds are strewn on the soil by means of free fall or a weak air flow. Thus, the seeds can, for example, be dropped through a seed container gate onto the soil. This type of sowing method is described e.g. in the magazine "Koneviesti", No. 13, Aug. 5, 1994.

A drawback in the prior known sowing methods is the slowness of sowing, some of the seeds landing in a wrong place (by the wind, for example), as well as a poor germinating capacity. Another drawback in the prior known sowing methods is the susceptibility to faults in varying conditions. Hence, the required equipment is also complicated, bulky and expensive. An object of this invention is to alleviate the above drawbacks and that is achieved by a method of the invention such that the seeds are shot by means of a compressed-air pulse to their destination.

The mechanisms intended for carrying out a method of the invention are also set forth herein; and A large number of applications can be found for the invention. The accompanying figures are only intended as examples and to illustrate the mode of operating the invention.

The primary object of this invention is to carry out the sowing effectively and accurately in the right place. Thus, valuable seeds can be spared and the initial growth thereof can be secured as well as possible. The partial burial of seeds in the soil promotes germination. The driving of seeds into soil cavities serves the same purpose, the seeds being shot at a high velocity during planting. This provides a high working efficiency. A method of the invention can be used for carrying out sowing operations for a variety of plants, as the need may be.

Figure 1:
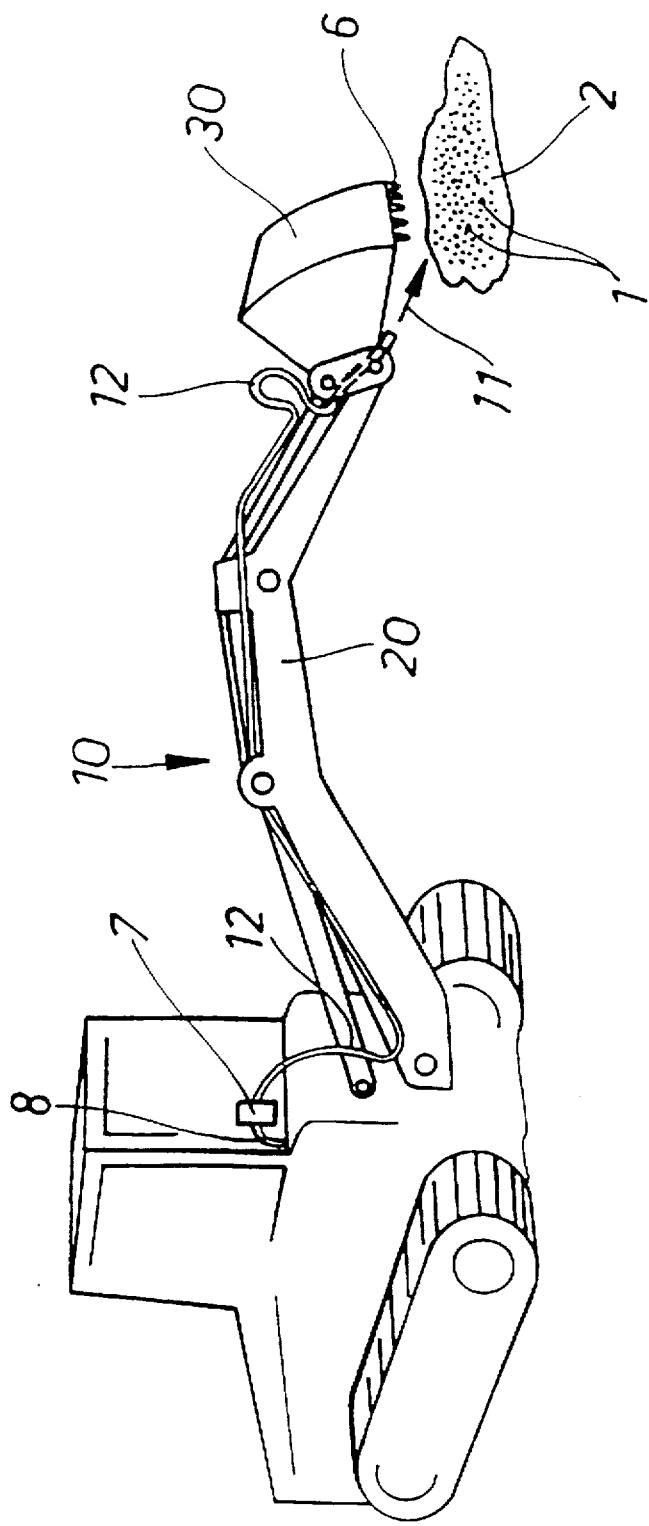
FIG. 1 shows a sowing apparatus of the invention applied to an excavator.

FIG. 1 depicts in principle one sowing machine 10 intended for implementing a method of the invention. In this case, a forest machine of excavator type is fitted in the operator's field of vision with a seed dispenser 7, from which extends a seed delivery duct 12 along the machine's working boom 20 to the vicinity of an excavating bucket 30, wherein seeds 1 are shot from a compressed-air line at a high velocity 11 onto a soil 2. Thus, the seeds may partially bury themselves in crumbled and exposed rich soil 2. With a harrow type of crumbling tine 6 it has been possible to prepare the soil 2 for sowing by clearing the brush and by exposing the rich soil and mineral soil from below a layer of hay.

After the soil 2 has been prepared, the operator releases a compressed-air pulse 8, the seeds discharging at a high velocity along the compressed-air duct 12 in the form of a desired shower of seeds 11 accurately to a selected destination. The sowing machine 10 is capable of operating from a single location over a wide range.

Figure 2:
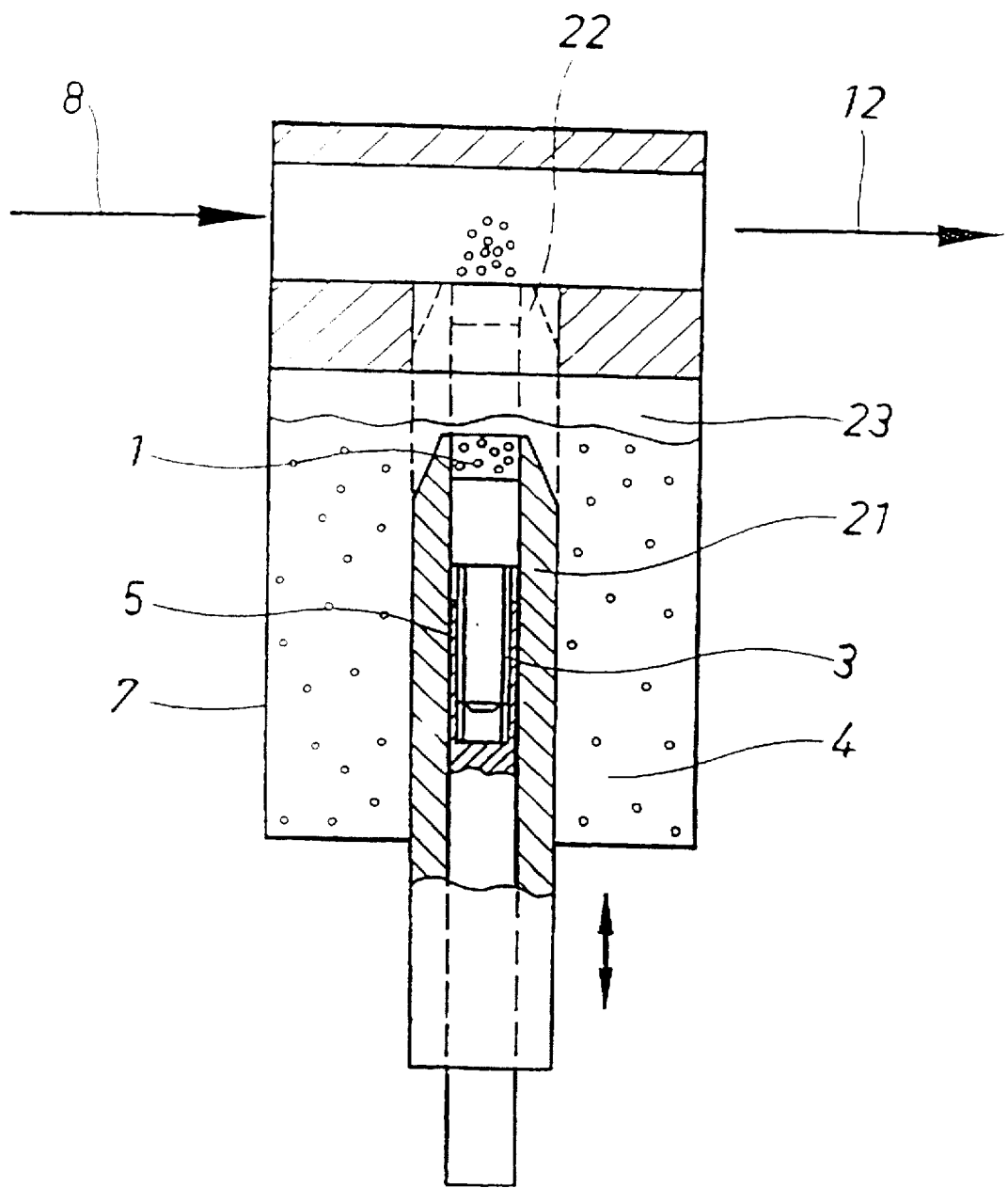
FIG. 2 shows a seed dispenser of the invention in principle.

FIG. 2 depicts one seed dispenser 7 according to the invention. Following the preceding sowing procedure, the compressed-air pulse 8 can be used for simultaneously loading the dispenser 7 with fresh seeds 1 for another sowing operation. The compressed-air pulse 8 is capable of momentarily placing a metering piston 21 lower in a seed container 4 and, upon rising to a top position 22, a new batch of seeds can be brought up into the compressed-air duct 12 for the next sowing operation. The amount of seeds can be adjusted to be greater or smaller by varying the vertical position of a regulating piston 3 by means of threads 5. After the next sowing operation, the metering piston 21 revisits the lower position in the bulk of seeds 4. Thus, an air space 23 above the metering piston 21 assists by dropping the extra seeds 1 back into the seed chamber 4.

A sowing method of the invention is particularly intended for supplementary or reforestation (e.g. after loggings or forest disasters). According to the invention, the sowing can be carried out with a lot less damage to the nature than in traditional methods. Just a very thin layer of topsoil is removed. Forest clearings or other invasive actions are not needed but the sowing can be effected on precisely selected, rather small-area pieces of soil 2, which can be placed, for example, between growing trees or other selected positions with just a delicate working of the soil. Thus, the novel method is ecologically beneficial.

If desired, the equipment of the invention can be fitted as accessories to traditional forest machines. The compressed air can be produced by means of a small pneumatic compressor. When pressing the release mechanism, the dispensing piston 3 can be automatically controlled to always visit the bottom position and to rise back to the top position along with the seeds in anticipation of another release effected by the operator with the compressed air 8.

The sowing of the invention can be carried out quickly, for example after a logging operation when the soil is still moist and the growth picks up well.

A method of the invention can be readily used for replacing the seeds with another variety as the dispenser, along with the seeds contained therein, is readily replaceable and detectable within the operator's field of vision. A method of the invention can also be used for carrying out sowing operations for other purposes, for example in agriculture, environmental service, landscaping and gardening. Every sowing procedure can be automatically counted from compressed-air pulses.

I claim:

1. A sowing apparatus for sowing seeds comprising:
a seed supply;
a compressed-air duct extending to a sowing site;
a compressed-air pulse producer for sending compressed-air pulses through the duct; and
a seed dispenser communicating with the seed supply and the duct, the seed dispenser including a reciprocating piston having an adjustable seed amount metering space for receiving a quantity of seeds from the seed supply, the piston also being biased toward the duct and having a depressible portion communicating with the duct, the piston moving toward a loading position when a compressed-air pulse exerts pressure against the depressible portion and returning toward a dispensing position in the absence of a compressed-air pulse exerting pressure against the depressible portion, the metering space communicating with the seed supply when the piston is in the loading position and the metering space communicating with the duct when the piston is in the dispensing position.

2. A sowing apparatus as set forth in claim 1, wherein the dispenser further includes a release mechanism for releasing the compressed-air pulses, the release mechanism automatically controlling the release of the compressed-air pulses so as to control reciprocating movement of the piston between the loading position and the dispensing position.

3. A sowing apparatus as set forth in claim 2, wherein the release mechanism is operable by an operator of the apparatus to release the compressed-air pulses.

4. A sowing apparatus as set forth in claim 3, wherein the sending of each compressed-air pulse reciprocates the piston so as to load the metering space with seeds and to dispense the seeds into the duct for a next sowing operation.

5. A sowing apparatus as set forth in claim 1, wherein the dispenser is located within the field of vision of an operator of the sowing apparatus for monitoring the amount and grade of seeds to be sown.

6. A sowing apparatus as set forth in claim 2, further comprising a counter for counting each released compressed-air pulse to thereby monitor a number of quantities of seeds sown.

7. A sowing apparatus as set forth in claim 1, further comprising a working boom which movably orients the duct, the working boom having an end fitted with an excavating bucket for protecting an end of the duct nearest the soil from wind.

8. A sowing apparatus as set forth in claim 7, wherein the excavating bucket further comprises a harrow-type crumbling tine for preparing soil at the sowing site.

9. A method for sowing seeds on soil comprising:
   sending a first compressed-air pulse through a compressed-air duct extending to a sowing site, the first compressed-air pulse momentarily exerting pressure against a depressible portion of a reciprocating piston, the depressible portion communicating with the duct, the piston being biased toward the duct;
   reciprocating the piston by the momentary exertion of pressure by the first compressed-air pulse against the depressible portion of the piston, the piston moving toward a loading position while the first compressed-air pulse exerts pressure against the depressible portion and the piston returning toward a dispensing position after the first compressed-air pulse has ceased exerting pressure against the depressible portion;
   loading a first quantity of seeds from a seed supply into an adjustable seed amount metering space provided in the piston while the piston is in the loading position;
   dispensing the first quantity of seeds from the metering space into the duct while the piston is in the dispensing position; and
   sending a second compressed-air pulse through the duct to deliver the first quantity of seeds dispensed into the duct to the soil through the duct.

10. A method as set forth in claim 9, wherein the compressed-air pulses are released by an operator.

11. A method as set forth in claim 9, wherein the metering space communicates with the seed supply while the piston is in the loading position, and the metering space communicates with the duct while the piston is in the dispensing position.

12. A method as set forth in claim 9, wherein the first quantity of seeds is dispensed at a dispensing region of the duct, the method further comprising:
   reciprocating the piston by momentary exertion of pressure of the second compressed-air pulse against the depressible portion of the piston, the piston moving toward the loading position while the second compressed-air pulse exerts pressure against the depressible portion and the piston, returning toward the dispensing position after the second compressed-air pulse has ceased exerting pressure against the depressible portion;
   loading a second quantity of seeds from the seed supply into the metering space while the piston is in the loading position caused by the exertion of pressure of the second compressed-air pulse against the depressible portion of the piston; and
   dispensing the second quantity of seeds from the metering space into the duct when the piston returns to the dispensing position, the second quantity of seeds being dispensed after the second compressed-air pulse has ceased exerting pressure against the depressible portion of the piston and after the second compressed-air pulse has conveyed the first quantity of seeds away from the dispensing region.

13. A method as set forth in claim 9, wherein the second compressed-air pulse which delivers the first quantity of seeds to the soil is sent after the first compressed-air pulse which reciprocates the piston.

14. A method as set forth in claim 9, wherein each compressed-air pulse both delivers a first quantity of seeds dispensed into the duct at a dispensing region to the soil through the duct and also reciprocates the piston by momentarily exerting pressure against the communicating portion to load a second quantity of seeds into the metering space, the second quantity of seeds being dispensed into the duct after the compressed-air pulse has ceased exerting pressure against the depressible portion of the piston and has conveyed the first quantity of seeds away from the dispensing region.

15. A method for sowing seeds on soil comprising:
   sending a first compressed-air pulse through a compressed-air duct extending to a sowing site, the first compressed-air pulse conveying a first quantity of seeds from a dispensing region of the duct to the sowing site, the first compressed-air pulse also momentarily exerting pressure against a depressible portion of a reciprocating piston, the depressible portion communicating with the duct, and the piston being biased toward the duct;
   reciprocating the piston by the momentary exertion of pressure by the first compressed-air pulse against the depressible portion of the piston, the piston moving toward a loading position while the first compressed-air pulse exerts pressure against the depressible portion and the piston returning toward a dispensing position after the first compressed-air pulse has ceased exerting pressure against the depressible portion;
   loading a second quantity of seeds from a seed supply into an adjustable seed amount metering space provided in the piston while the piston is in the loading position; and
   dispensing the second quantity of seeds from the metering space into the dispensing region of the duct while the piston is in the dispensing position and after the first compressed-air pulse has conveyed the first quantity of seeds away from the dispensing region of the duct toward the sowing site.

16. A method as set forth in claim 15, wherein the metering space communicates with the seed supply while the piston is in the loading position, and the metering space communicates with the duct while the piston is in the dispensing position.

17. A method as set forth in claim 15 further comprising:
   sending a second compressed-air pulse through the duct, the second compressed-air pulse conveying the second quantity of seeds from the dispensing region of the duct to the sowing site, the second compressed-air pulse also momentarily exerting pressure against the depressible portion of the reciprocating piston;
   reciprocating the piston by the momentary exertion of pressure by the second compressed-air pulse against the depressible portion of the piston, the piston moving toward the loading position while the second compressed-air pulse exerts pressure against the depressible portion and the piston returning toward the dispensing position after the second compressed-air pulse has ceased exerting pressure against the depressible portion;

loading a third quantity of seeds from the seed supply into the metering space while the piston is in the loading position; and dispensing the third quantity of seeds from the metering space into the dispensing region of the duct while the piston is in the dispensing position and after the second compressed-air pulse has conveyed the second quantity of seeds away from the dispensing region of the duct toward the sowing site.

18. A method as set forth in claim 15, wherein each compressed-air pulse both delivers a first quantity of seeds dispensed into the duct at a dispensing region to the soil through the duct and also reciprocates the piston by momentarily exerting pressure against the depressible portion to load a second quantity of seeds into the metering space, the second quantity of seeds being dispensed into the duct after the compressed-air pulse has ceased exerting pressure against the depressible portion of the piston and has conveyed the first quantity of seeds away from the dispensing region.

* * * * *